Figure 1:
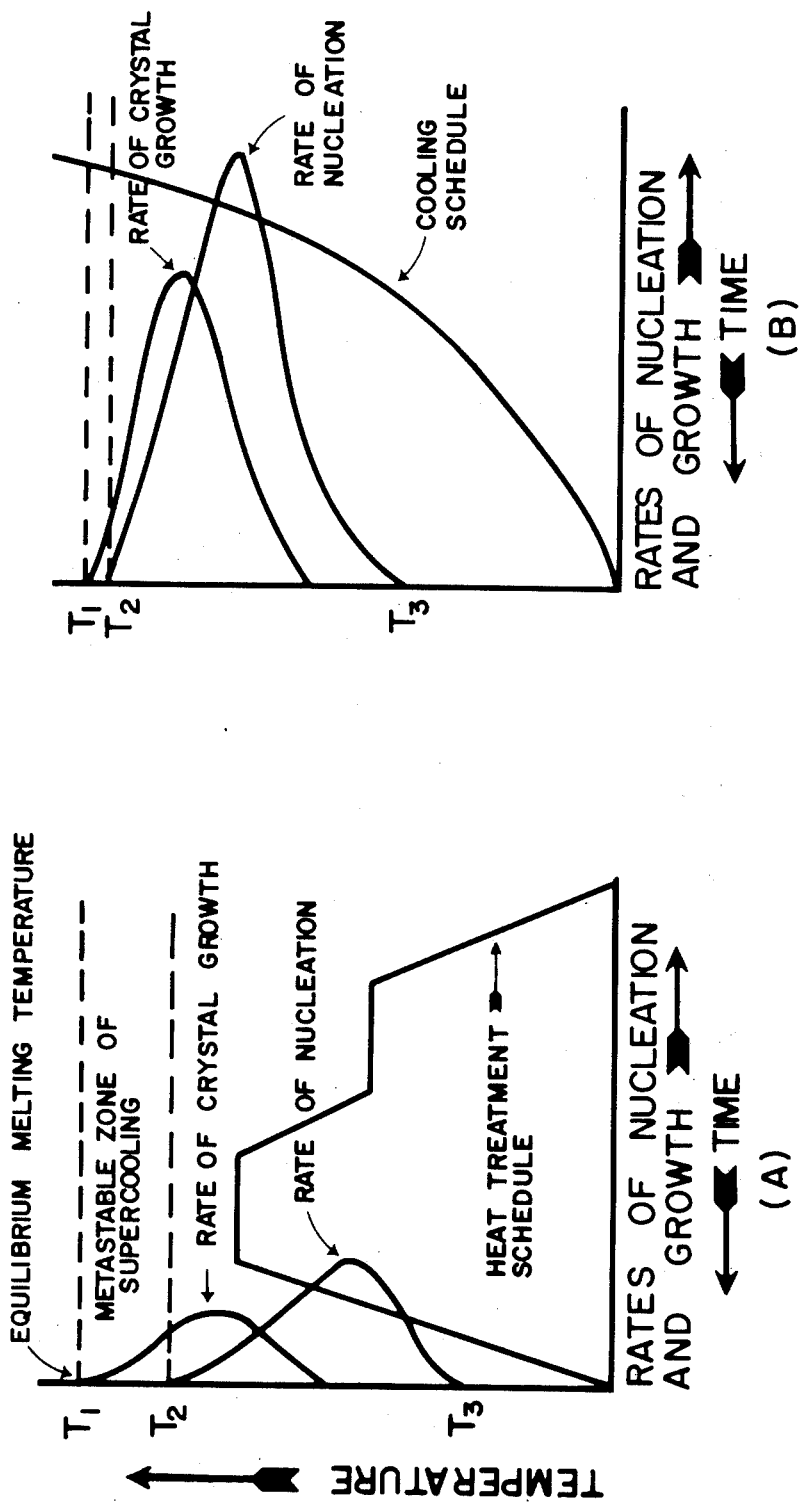

United States Patent [19]
Grossman

[11] 3,985,532
[45] Oct. 12, 1976

[54] SPONTANEOUSLY-FORMED CELSIAN GLASS-CERAMICS
[75] Inventor: David G. Grossman, Corning, N.Y.
[73] Assignee: Corning Glass Works, Corning, N.Y.
[22] Filed: Mar. 19, 1975
[21] Appl. No.: 559,726

[52] U.S. Cl. .................................. 65/33; 106/39.8
[51] Int. Cl.² .................... C03B 32/00; C03C 3/22
[58] Field of Search ................ 106/39.6, 39.7, 39.8; 65/33

[56] References Cited
UNITED STATES PATENTS

| | | | |
|---|---|---|---|
| 2,920,971 | 1/1960 | Stookey | 106/39.6 |
| 3,236,662 | 2/1966 | MacDowell | 106/39.6 |
| 3,804,608 | 4/1974 | Gaskell et al. | 106/39.7 |

Primary Examiner—Winston A. Douglas
Assistant Examiner—Mark Bell
Attorney, Agent, or Firm—Clinton S. Janes, Jr.; Clarence R. Patty, Jr.

[57] ABSTRACT

The instant invention relates to the production of articles exhibiting the physical properties and internal microstructure of glass-ceramic materials but which can be formed spontaneously from a molten glass, i.e., no heat treatment of a glass body to cause the crystallization in situ thereof is required, as is demanded in the manufacture of conventional glass-ceramic articles. More specifically, this invention is concerned with the production of glass-ceramic articles having compositions within the $BaO-Al_2O_3-SiO_2-F$ field which, when nucleated with $TiO_2$, contain celsian ($BaO.Al_2O_3.2SiO_2$) as the predominant crystal phase, and which can be formed spontaneously from a molten glass batch.

3 Claims, 3 Drawing Figures

SPONTANEOUSLY-FORMED CELSIAN GLASS-CERAMICS

United States Applications Ser. Nos. 559,725 and 559,787, filed concurrently herewith by the present applicant and United States application Ser. No. 559,732, filed concurrently herewith by J. E. Flannery and D. R. Wexell, describe the production of spontaneously formed glass-ceramic articles wherein a fluormica constitutes the predominant crystal phases. United States Applications Ser. Nos. 559,727 and 559,789, filed concurrently herewith by the present applicant disclose the manufacture of spontaneously formed glass-ceramic articles wherein beta-spodumene solid solution and mullite, respectively, comprises the primary crystal phase. United States Applications Ser. Nos. 559,731 and 559,730, filed concurrently herewith by H. L. Rittler, discuss the formation of spontaneously-formed glass-ceramic articles wherein BaO and/or SrO-$Fe_2O_3$-$SiO_2$ solid solution and carnegieite and/or nepheline solid solution, respectively, constitutes the principal crystal phase. United States Application Ser. No. 559,788, filed concurrently herewith by G. H. Beall, P. E. Blaszyk, and W. T. Brydges, III, describes the production of spontaneously formed glass-ceramic articles wherein beta-spodumene solid solution comprises the predominant crystal phase. Finally, United States Application Ser. No. 559,786, filed concurrently herewith by G. H. Beall describes the manufacture of spontaneously formed glass-ceramic articles wherein alphaquartz solid solution constitutes the primary crystal phase.

U.S. Pat. No. 2,920,971 provided the foundation for the art of glass-ceramics. That patent discloses the manufacture of glass-ceramic articles as being based upon the controlled heat treatment of a precursor glass body. Hence, as is explained therein, the classic production technique for glass-ceramic articles contemplates three general steps. First, a glass-forming batch, to which a nucleating agent is customarily added, is melted. Second, this melt is simultaneously cooled to at least within and, commonly, below the transformation range to yield an essentially crystal-free glass and an article of a desired geometry is shaped therefrom. Third, this glass shape is heated to a temperature above the transformation range thereof to cause the growth of crystals in situ. [The transformation range has been considered to be that temperature at which a molten mass is converted into an amorphous solid and has generally been defined as lying in the vicinity of the annealing point of a glass.] In most instances, the third or crystallization step is divided into two parts. Thus, the glass shape will initially be heated to a temperature slightly above the transformation range and held thereat for a sufficient length of time to secure substantial nucleation. Thereafter, the nucleated shape will be heated to a higher temperature, commonly above the softening point of the precursor glass, to cause the growth of crystals on these nuclei.

This careful heat treatment of the glass body produces a homogeneously crystallized article wherein the crystals are relatively uniform in size. Customarily, glass-ceramic articles are predominantly crystalline and the crystals, themselves, very fine-grained. However, for a more detailed discussion of the theoretical aspects and practical considerations involved in the production of glass-ceramic articles, attention is called to U.S. Pat. No. 2,920,971, supra.

It has frequently been observed during the cooling of molten batches to form glass bodies that crystallization will occur, commonly originating at the surface and growing into the body of the glass. This phenomenon has been designated as "normal" devitrification and is almost always deemed undesirable, since the resultant microstructure reveals non-uniformly sized, relatively coarse crystals which are customarily oriented in a plane perpendicular to the surface. Such a microstructure conventionally proves to yield a mechanically weak body.

This "normal" devitrification phenomenon differs in basic mechanism from the production of glass-ceramic articles inasmuch as it contemplates crystallization occurring at or near the liquidus temperature. The fusion casting of refractory ceramic materials is another example of crystallization taking place at or near the liquidus. As opposed to that, the production of glass-ceramic articles through the controlled heat treatment of precursor glass bodies involves temperatures far below the liquidus, thereby providing a larger degree of supercooling, such that the crystallization process occurs at a much higher viscosity level where time can be used to influence the nucleation and crystal growth rates.

The present invention relates to spontaneously formed glass-ceramic articles, that is, articles exhibiting physical properties and microstructures similar to those of conventional glass-ceramic bodies, but which can be produced through the simple cooling of a glass-forming melt with no subsequent heat treatment of a glass body being required. Hence, certain compositions within the BaO-$Al_2O_3$-$SiO_2$-F-$TiO_2$ field, when cooled from a melt, can yield a uniformly fine-grained, homogeneous dispersion of crystals within a glassy matrix without the need for any further heat treatment. In these compositions, the crystals have been found to comprise the predominant proportion of the total volume of the body, i.e., greater than about 50%, and have diameters less than about 5 microns.

A study of FIG. 1 can be helpful in understanding the difference in crystallization mechanism existing between the instant spontaneously formed glass-ceramic bodies and the classic glass-ceramic articles. The key is believed to reside in the overlap of the rate curves for nucleation and crystallization set out therein. Thus, below the equilibrium melting temperature of a viscous liquid $T_1$, there is a temperature interval ($T_1$-$T_2$) wherein nuclei do not form at a detectable rate. This range of temperatures is denominated the metastable zone of supercooling. In the case of conventional glass-ceramic compositions, no crystals form at or just below the metastable zone because of the low nucleation rate there. Hence, nucleation takes place within the temperature range $T_2$-$T_3$.

The crystallization process intrinsic to the manufacture of classic glass-ceramic bodies is illustrated in FIG. 1(A). As is illustrated there, crystallization is achieved by first reheating the supercooled liquid (a glass body) into the region of maximum nucleation, holding thereat for a sufficient period of time to attain the substantial development of nuclei, and then heating the nucleated body into the region of maximum crystal growth for a time necessary to obtain the desired crystal growth.

FIG. 1(B) sets out the nucleation-crystallization relationship existing in the case of spontaneously formed glass-ceramics. As can be seen, the metastable zone of supercooling is much smaller and the rates of nucleation and crystal growth much greater. These factors lead to the situation that nucleation and crystallization can take place with sufficient rapidity at temperatures just below the zone of metastable supercooling that substantial dwell periods within those respective regions are unnecessary. Therefore, a simple cooling schedule applied to the melt can function to produce a body having a uniformly fine-grained crystal dispersion therein. However, it will be appreciated that the melt can be quenched at such a rapid rate through the respective intervals of nucleation and crystallization that the desired fine-grained glass-ceramic article will not be produced.

The presence of fluorine has been found essential in securing the desired spontaneous crystal growth. The presence of fluorine gives rise to a phase separation which is believed to be a forerunner of the crystallization phenomenon. Spontaneous opal glasses resulting from phase separation are well-known in fluorine-containing glass systems.

U.S. Pat. No. 3,804,608 discloses a number of compositions which can be formed into glass-ceramic articles without employing the reheating step required in the production of conventional glass-ceramic bodies. However, no reference is made therein to compositions within the $BaO-Al_2O_3-SiO_2-F-TiO_2$ field which can be crystallized to articles having physical properties and microstructures similar to conventional glass-ceramic articles wherein the predominant crystal phase is celsian.

The glasses operable in the present invention consist essentially, by weight on the oxide basis as calculated from the batch, of about 25–45% BaO, 15–30% $Al_2O_3$, 20–40% $SiO_2$, 3–15% F, and 4–15% $TiO_2$. In general, the most desirable glass-ceramic articles will be produced where the composition of the precursor glass-forming melt consists solely of the quinary. However, the presence of $B_2O_3$ can be useful in controlling viscosity and improving uniformity of crystal grain size, although it adds to the residual glassy matrix in the final crystallized product. Arsenic oxide acts to keep the $TiO_2$ in the oxidized state, thereby giving the crystalline body a white appearance. From the point of view of uniformly fine-grained crystallinity and facility of manufacture, the preferred compositions consist essentially of about 30–35% BaO, 18–23% $Al_2O_3$, 28–36% $SiO_2$, 8–13% F, and 8–12% $TiO_2$ with 0.3–0.5% $As_2O_3$ and 2–7% $B_2O_3$.

Minor additions of various compatible metal oxides can be tolerated up to a total of about 10% by weight. In the main, the inclusion of such materials as $Li_2O$, $Na_2O$, $K_2O$, SrO, and PbO appears to yield a coarser-grained product, whereas MgO seemingly inhibits the development of crystals. Individual additions of these components ought not to exceed a few percent. Small additions of CaO appear to have no substantive effect upon the final product although there is the possibility of solid solutions in the celsian crystals. Small additions of $ZrO_2$ likewise appear to have no substantive effect and may, perhaps, be acting as a secondary nucleant. However, additions of 5% and more result in the presence of $ZrO_2$ crystals in the glass-ceramic. The inclusion of $P_2O_5$ is normally to be avoided since it appears to simply increase the residual glassy matrix and is not required as a nucleating agent.

In general, the glass-ceramic articles exhibit coefficients of thermal expansion over the temperature interval of room temperature (R.T.) to 500° C. of about 55–80 × $10^{-7}$/° C. and over the range of R.T. to 900° C. of about 85–95 × $10^{-7}$/° C. Modulus of rupture values between about 10,000-15,000 psi have been measured and the presence of BaO has resulted in densities in excess of 3 g/cc.

Table I records a group of glass compositions, expressed in weight percent on the oxide basis as calculated from the batch, which are capable of being spontaneously crystallized into glass-ceramic articles. Since it is not known with which cation(s) the fluorine is combined, it is reported as fluoride (F) in accordance with conventional glass analysis practice. The fluorine ≈ oxygen correction factor is also reported. Fluorine volatilization during melting is relatively high, i.e., about 25–50% depending upon the melting temperatures employed. The batch ingredients may comprise any materials, either the oxide or other compound, which, when melted together, will be converted to the desired oxide in the proper proportion. In the compositions reported in Table I, $AlF_3$ provided the fluoride content. $As_2O_5$ acted as a fining agent.

The batch ingredients were blended together in a ball mill to aid in obtaining a homogeneous melt and then run into a platinum crucible. After covering, the crucible was placed in a gas-fired furnace and the batch melted at 1550° C. for 6 hours. The melts were very fluid, having a viscosity of only about 3–4 poises at the melting temperature. The melt was poured into a graphite or steel mold to yield a slab about 6 × 6 × ½ inches. The slab was allowed to cool to about 800° C., as measured with an optical pyrometer, this cooling taking about 60 seconds, and then transferred to an annealer operating at about 700° C.

The cooling of the melt was monitored with an optical pyrometer. The molten batch appeared to stiffen in the normal manner of a glass melt until a temperature of about 1050°–1250° C. was reached. At about that range of temperatures, a hazy opalization was observed at the surface of the slab and at the interface between the melt and the mold sides, which quickly moved toward the center of the slab. Almost immediately thereafter crystal growth began.

This opalization phenomenon is demanded to secure the subsequent growth of uniformly fine-grained celsian crystallization. FIG. 1(B) can provide a guide for explaining the reason for this. Hence, as is illustrated therein, there must be a very high degree of nucleation at temperatures approximating the optimum crystal growth temperature to obtain fine-grained crystallization as the molten batch cools. It is this opalization, commonly occurring at about 100°–300° C. above the annealing point of the glass, which furnishes the necessary nucleation.

Nevertheless, whereas spontaneous opalization has been observed in numerous glasses, unless one of the amorphous phases developed in the opalization is at least partially unstable as a glass so crystallites of some type are precipitated to provide nuclei, there will be no spontaneous crystallization of the major glass components following the opalization reaction.

In summary, whereas the mechanism resulting in the extremely rapid and spontaneous growth of crystals is not fully comprehended, it has been hypothesized that crystallites are developed at temperatures far above the annealing point of the glass during or immediately subsequent to the opalization phenomenon, which then function as nuclei while the glass mass is still within the temperature range of maximum crystal growth.

TABLE I

|  | 1 | 2 | 3 | 4 | 5 | 6 | 7 | 8 |
|---|---|---|---|---|---|---|---|---|
| BaO | 32.4% | 32.1% | 33.4% | 27.9% | 30.2% | 27.1% | 27.4% | 32.9% |
| SrO | — | — | — | — | — | 2.3 | — | — |
| $Al_2O_3$ | 21.5 | 21.3 | 22.3 | 23.3 | 22.4 | 22.5 | 22.9 | 21.9 |
| $SiO_2$ | 27.9 | 27.6 | 28.8 | 30.1 | 29.0 | 29.2 | 29.6 | 28.4 |
| F | 9.6 | 7.2 | 5.0 | 10.4 | 10.0 | 10.1 | 10.2 | 7.3 |
| $TiO_2$ | 8.7 | 10.2 | 8.7 | 8.7 | 8.7 | 8.7 | 8.6 | 8.7 |
| $B_2O_3$ | 3.5 | 3.4 | 3.5 | 3.5 | 3.5 | 4.3 | 5.2 | 3.5 |
| $As_2O_5$ | 0.4 | 0.4 | 0.4 | 0.4 | 0.4 | — | 0.4 | 0.4 |
| $Na_2O$ | — | 0.9 | — | — | — | — | — | — |
|  | 104.0 | 103.1 | 102.1 | 104.3 | 104.2 | 104.2 | 104.3 | 103.1 |
| F ≈ O | −4.0 | −3.1 | −2.1 | −4.3 | −4.2 | −4.2 | −4.3 | −3.1 |
|  | 100.0 | 100.0 | 100.0 | 100.0 | 100.0 | 100.0 | 100.0 | 100.0 |

Table II presents a summary of the physical properties and makeup observed when the slabs were removed from the annealer. Thus, a visual description of the slab exterior and a fracture surface is provided and the crystal phases observed as determined through X-ray diffraction analyses are reported. Also, the coefficient of thermal expansion ($\times 10^{-7}/°$ C.) over the range of R.T. to 500° C., the modulus of rupture (psi), and the density (g/cc) are recorded as determined in accordance with standard measuring techniques.

Figure 2:

FIG. 2, a replica micrograph of the product of Example 8, depicts the characteristic microstructure of the highly crystalline slabs. The white bar at the base of the micrograph represents a distance of one micron. The celsian appears as blocky crystals and the needle-like crystals are rutile ($TiO_2$). From the photograph it can be seen that the crystals appear to be less than 1 micron in diameter and the crystallinity obviously exceeds 50% by volume.

High temperature viscosity measurements have indicated a "setting point" in the temperature range of about 1150°–1250° C. It is believed that this "setting point" probably corresponds to the onset of crystallization which could thus account for a sudden increase in apparent viscosity.

perature of phase separation and nucleation for a period of time sufficient to cause crystallization of the desired celsian phase. Fourth, the crystallized body is cooled to room temperature.

As has been observed above, the second or phase separation step is of vital significance to the successful operation of the invention. Thus, the rate of cooling the melt must not be so rapid that adequate time is not provided for the demanded phase separation and nucleation to take place. Laboratory experience has demonstrated that, with the compositions of the instant invention, cooling rates between about 10°–1000° C./minute will insure sufficient phase separation and nucleation. These phenomena generally occur at temperatures between about 850°–1050° C.

Seeing that the compositions of this invention crystallize very rapidly following the phase separation and nucleation reactions, exposure times within the crystallization range of as brief as two minutes may be adequate to attain high crystallinity, i.e., greater than about 50% by volume of the body. In general, crystallization will take place at temperatures between about 650°–850° C. However, as was suggested above in the specific examples, ease in production has recommended that the glass body which has been phase sepa-

TABLE II

| Example No. | Visual Description | Crystal Phases | Exp. Coef. | Modulus of Rupture | Density |
|---|---|---|---|---|---|
| 1 | medium-grained crystals, rough fracture, opaque white | celsian & rutile | 66.7 | 9700 | 3.28 |
| 2 | " | " | 78.0 | 9700 | 3.28 |
| 3 | " | " | 65.9 | — | 3.30 |
| 4 | fine to medium-grained crystals almost smooth fracture, gray-white | " | — | — | 3.19 |
| 5 | " | " | 72.9 | 9980 | 3.22 |
| 6 | fine-grained crystals, dull fracture, gray-blue | " | 66.7 | 10300 | 3.19 |
| 7 | very fine-grained crystals, smooth shiny fracture, opaque white | " | 57.2 | — | 3.16 |
| 8 | fine-grained, smooth fracture, white | " | 67.7 | — | — |

To recapitulate, the process of the present invention utilizes four general steps. First, a glass-forming batch having a composition within the above-outlined operable range is melted. Second, the molten batch is simultaneously cooled to a temperature about 100°–300° C. above the annealing point of the glass to achieve phase separation and nucleation (occurring during the opalization phenomenon) and a glass body shaped therefrom. Third, the glass body is exposed to a temperature between the annealing point of the glass and the temrated and nucleated be placed into an annealer operating within or slightly above the crystallization interval and then cooled to room temperature therein.

Annealing apparatus and methods conventionally utilized in the glassmaking art are similarly appropriate here. Hence, annealing times as short as 0.5 hour can be employed, but the more usual practice contemplates periods of two hours or more. Nevertheless, the use of very long annealing schedules does not appear to improve the physical properties or internal microstructure of the final product to any significant extent, so such practice is not viewed with any favor from an economic point of view.

Whereas the preferred embodiment of the instant invention is founded in crystallizing the phase separated and nucleated glass body during a simple cooling to room temperature, it is quite possible to cool the melt so rapidly that phase separation and nucleation will take place, but the fine-grained celsian crystallization will not occur, thereby resulting in a body that is essentially glassy. However, the desired crystallization of that glassy body can be effected by merely exposing it to a temperature within the crystallization interval in like manner to that described above with respect to the crystallization obtained when the molten batch is merely cooled to room temperature. Thus, here again, it is the occurrence of the opalization at temperatures above the crystallization range which is of critical importance to the operability of the invention.

Finally, the mechanical strength of the crystallized bodies may be materially improved by utilizing a thermal tempering process such as is employed with glass articles. Hence, as is shown in Ser. No. 559,788, supra, filed concurrently herewith by Beall, Blaszyk, and Brydges, a comparison of the mechanical strength demonstrated by annealed crystallized articles with that exhibited by crystallized articles rapidly chilled from the crystallization range to room temperature can evidence a substantial enhancement in strength in the latter articles. The quick quenching can be especially effective when the crystallization is undertaken at the upper extreme of the crystallization range. Air tempering, viz., exposing the crystallized article to a blast of cold air to chill it to room temperature, is the preferred technique due to ease of practice and relative low cost, but immersion in various liquids such as oils and salt baths can also be operable.

The mechanism working to provide this improvement in mechanical strength is not completely recognized but is believed to involve the small amount of residual glass which is assumed to be present as a continuous phase throughout the crystallized body. This assumption is believed supported in an examination of FIG. 2 wherein the residual glass is seen as small depressed regions because of its greater solubility in the etchant employed to make the replica electron micrograph.

I claim:

1. A method for making a highly crystalline glass-ceramic article consisting essentially of celsian and rutile crystals dispersed within a glassy matrix, said crystals constituting at least 50% by volume of said article, which comprises the steps of:
    a. melting a batch for a glass consisting essentially, by weight on the oxide basis as calculated from the batch, of about 25–45% BaO, 15–30% $Al_2O_3$, 20–40% $SiO_2$, 3–15% F, and 4–15% $TiO_2$;
    b. simultaneously cooling said melt at a rate between about 10°–1000° C./minute to a temperature about 850°–1050° C. to shape said melt into a glass body and obtain phase separation and nucleation therein;
    c. further cooling said shaped glass body and exposing said glass body to a temperature between about 650°–850° C. for a sufficient length of time to cause crystallization of the celsian and rutile crystals in said glass body; and then
    d. cooling the crystallized body to room temperature.

2. A method according to claim 1 wherein said time sufficient to cause crystallization is at least about 2 minutes.

3. A method according to claim 1 wherein said crystallized body is cooled to room temperature by means of a quick chilling technique to thermally temper said body.

* * * * *

UNITED STATES PATENT AND TRADEMARK OFFICE
CERTIFICATE OF CORRECTION

PATENT NO. : 3,985,532

DATED : October 12, 1976

INVENTOR(S) : David G. Grossman

It is certified that error appears in the above-identified patent and that said Letters Patent are hereby corrected as shown below:

Column 1, line 13, "spontaneously" should be -- spontaneously- --.

Column 1, line 30, "spontaneously formed" should be -- spontaneously-formed --.

Column 1, line 31, "alphaquartz" should be -- alpha-quartz --.

Column 2, line 26, "spontaneously" should be -- spontaneously- --.

Column 2, line 66, "spontaneously formed" should be -- spontaneously-formed --.

Column 5, line 24, after "replica" insert -- electron --.

Signed and Sealed this

First Day of March 1977

[SEAL]

Attest:

RUTH C. MASON
Attesting Officer

C. MARSHALL DANN
Commissioner of Patents and Trademarks